United States Patent [19]
Weston

[11] 4,382,630
[45] May 10, 1983

[54] COMBINATION ADJUSTMENT SEAT BACK HINGE FITTING

[75] Inventor: Allen H. Weston, Marshall, Mich.

[73] Assignee: Keiper U.S.A., Inc., Mich.

[21] Appl. No.: 261,015

[22] Filed: May 6, 1981

[51] Int. Cl.³ ............................................. A47C 1/025
[52] U.S. Cl. ................................... 297/362; 297/367; 297/379
[58] Field of Search ....................... 297/362, 366–369, 297/379, 355

[56] References Cited

U.S. PATENT DOCUMENTS

| | | | |
|---|---|---|---|
| 3,432,880 | 3/1969 | Putsch et al. | 297/362 X |
| 3,432,881 | 3/1969 | Putsch et al. | 297/362 X |
| 4,113,308 | 9/1978 | Werner et al. | 297/362 |

FOREIGN PATENT DOCUMENTS

| | | | |
|---|---|---|---|
| 2364755 | 8/1974 | Fed. Rep. of Germany | 297/367 |
| 2808889 | 9/1979 | Fed. Rep. of Germany | 297/379 |

*Primary Examiner*—William E. Lyddane
*Attorney, Agent, or Firm*—Lloyd M. Forster

[57] ABSTRACT

A hinge fitting for adjustably connecting a seat and a back rest, especially for motor vehicles, in which a pair of hinge members pivotally connected to each other have means for gradually continuously adjusting the angle of the hinge members and the elements fixed thereto relative to each other and in which supplemental means are provided for quick adjustment to any approximate angular relation within the total range of seat back adjustment subject to gradual adjustment to any desired precise seat back position.

17 Claims, 7 Drawing Figures

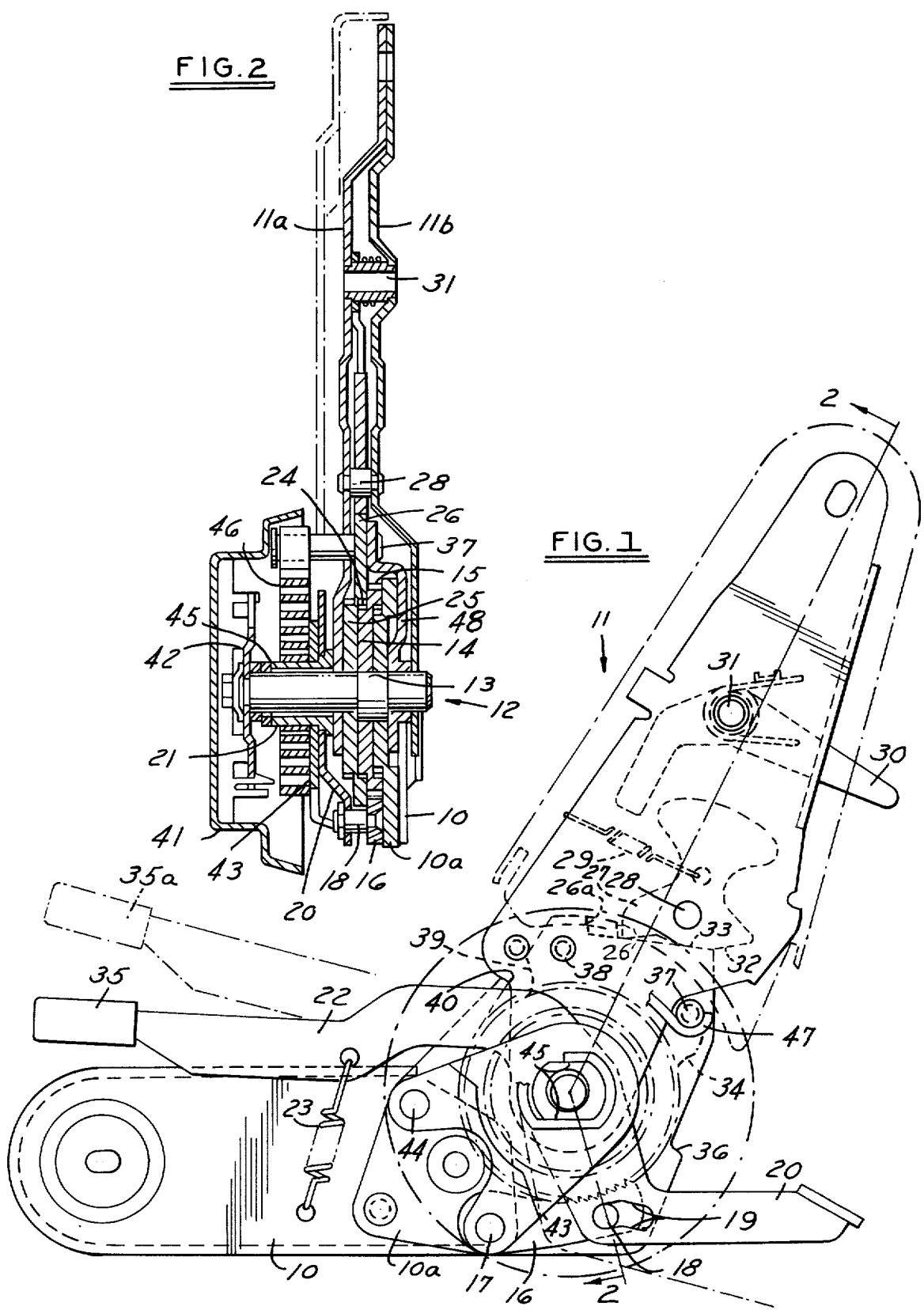

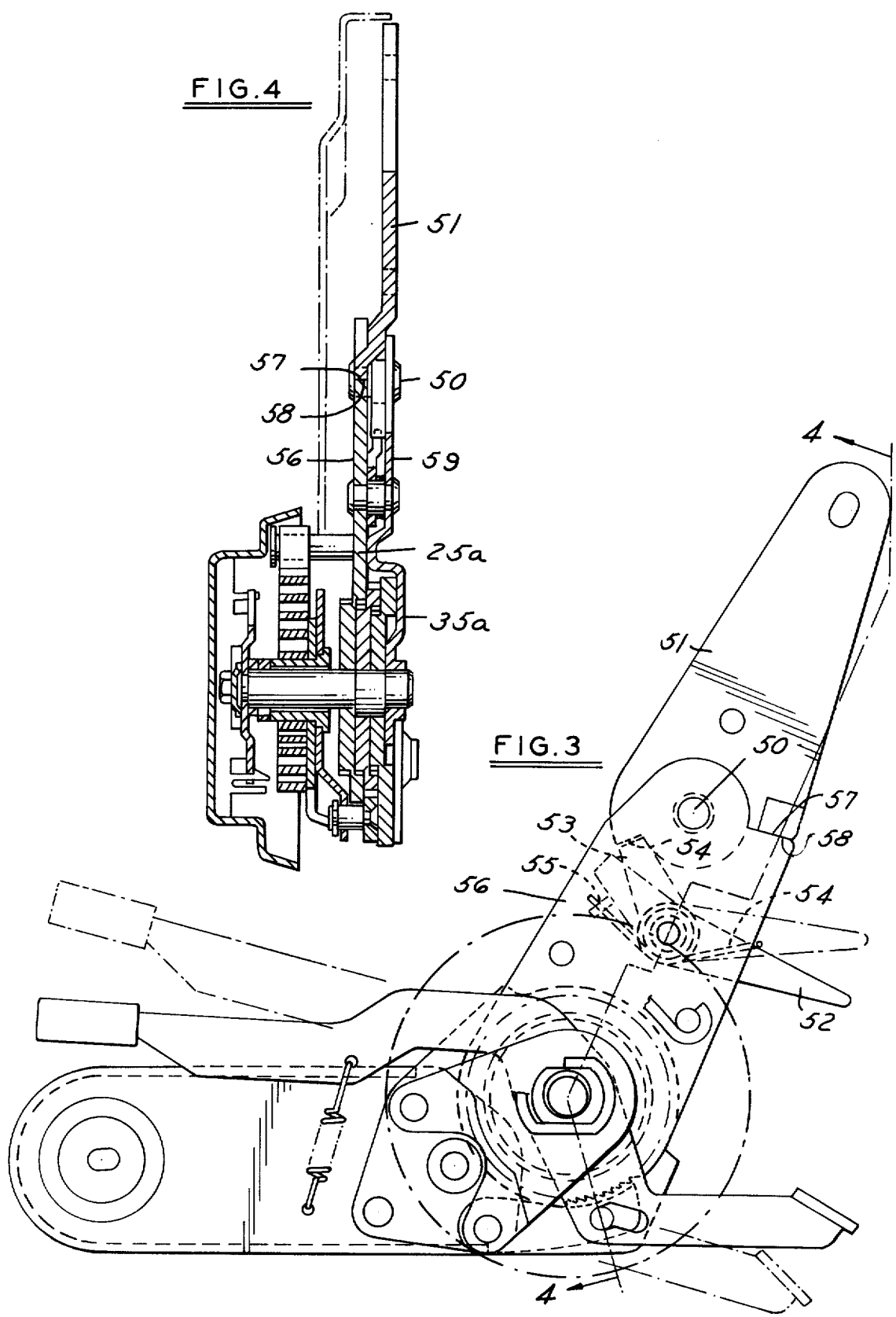

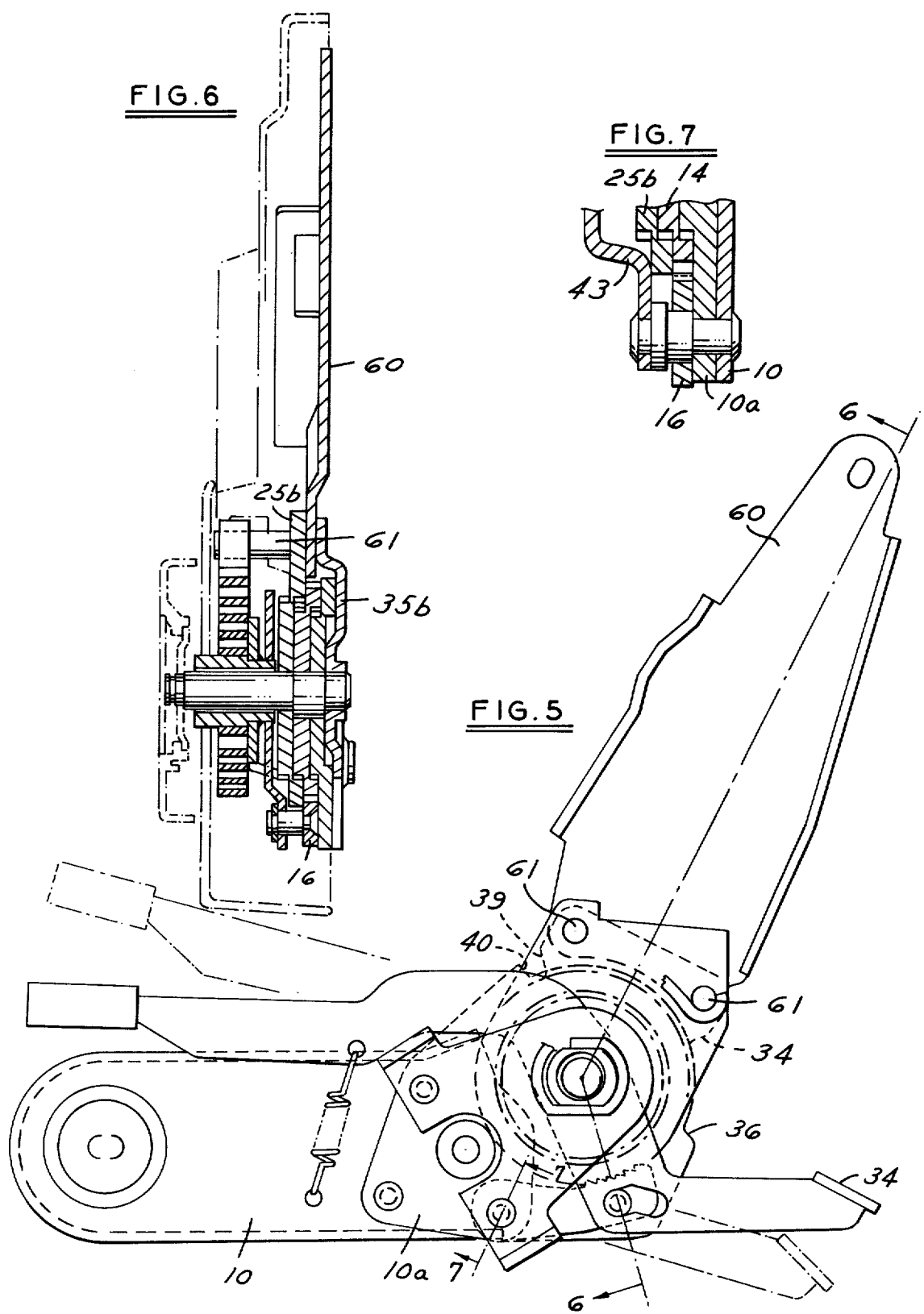

though not necessarily precisely at the position of most comfort for the occupant's personal preference. Fine adjustment is then available through taumel knob 41 which may be turned in either direction to tilt the seat back either forward or rearward from the quick adjustment position without disturbing such quick adjustment. Such taumel adjustment is available through the entire range even though the quick adjustment may be at either limit of its range of adjustment.

COMBINATION ADJUSTMENT SEAT BACK HINGE FITTING

BACKGROUND OF THE INVENTION

Prior art includes U.S. Pat. No. 3,432,881 disclosing gradually adjustable hinge members with means for releasing the operative angle of the hinge member fixed to the back rest relative to the seat hinge member. A similar adjustable two-part hinge fitting with a quick forward tilting release feature is disclosed in U.S. Pat. No. 3,432,880.

Additional prior art includes West German Patents Nos. 2,446,181 and 2,808,889 wherein a quick approximate ratchet and pawl adjustment within a limited range is combined with a gradual continuous taumel adjustment subject to interaction, however, preventing independent adjustment over the full range by either regardless of the position of the other.

SUMMARY OF THE PRESENT INVENTION

The limitations of the foregoing prior art have been overcome in the present invention wherein both the quick and gradual adjustment features are capable of operating anywhere within the full design range of seat back tilting adjustment. Accordingly, even when the gradual adjustment is full forward the approximate adjustment can be rapidly be made to any intermediate or full back position; or with the gradual adjustment in full rearward position quick approximate adjustment can be made to any intermediate or full forward position. Various alternative provisions are made for temporary forward "dumping" of the seat back to accommodate entry and exit of rear seat passengers in two-door models.

BRIEF DESCRIPTION OF THE DRAWINGS

FIG. 1 is a side elevation of a preferred embodiment of the present hinge fitting wherein forward dumping of the seat back takes place about the main hinge pivot;

FIG. 2 is a sectional view taken along the line 2—2 of FIG. 1;

FIG. 3 is a modification of the preferred embodiment providing a forward dump pivot located above the main hinge pivot;

FIG. 4 is a sectional view taken along the line 4—4 of FIG. 3;

FIG. 5 is a side elevation of a second modification without the forward dump feature;

FIG. 6 is a sectional view taken along the line 6—6 of FIG. 5;

FIG. 7 is a fragmentary sectional view taken along the line 7—7 of FIG. 5;

With reference to FIG. 1 the main elements of the preferred embodiment include lower seat bracket 10, auxiliary lower seat bracket 10a, upper seat back bracket 11 having a sandwich construction of spaced members 11a and 11b pivotally connected through eccentric pin 12 having eccentric lobe 13 pivotally engaging lower bracket 10a. Ratchet plate 14 also pivoted on eccentric 13 has external teeth 15 extending around its entire perimeter engageable by teeth of pawl 16 pivotally connected at 17 to lower seat brackets 10, 10a and having pin 18 engaging slot 19 formed in foot pedal arm 20 pivoted on bushing 21 extending over pin 12, clearance being provided between the smaller diameter of pivot pin 12 and the bore of bushing 45 sufficient to accommodate the relative eccentric movement imparted by eccentric cam 13 which has fixed center relative to seat bracket 10a offset from the axis of pin 12 extending within bushing 21. Handle extension 22 is held by tension spring 23 anchored in bracket 10 to an engagement position of pawl 16 with teeth 15 to normally prevent rotation of ratchet plate 14. External taumel gear teeth 24 on ratchet plate 15 engage internal taumel gear teeth on intermediate plate 25 piloted on pivot pin 12 having projection 26 engageable by latch 27 pivotally mounted at 28 to upper bracket side members 11a and 11b, said latch being normally retained by spring 29 in a latch engaging relation with projection 26 releasable through hand lever 30 pivotally mounted at 31 between upper bracket members 11a and 11b manual release of which permitting forward dumping of the seat back. The backward position of seat back bracket 11 relative to intermediate plate 25 is established by engagement of latch surface 32 with plate 25 projection 33.

Upon release of pawl 16 by actuation of foot pedal 20 or handle 35, seat back bracket 11 together with intermediate plate 25 and ratchet plate 14 are free to move to any approximately adjusted position within backward limits established by engagement of stop surface 34 of cover plate 48 with notch projection 36 of lower bracket 10a, cover plate 48 being secured to intermediate plate 25 by rivets 37 and 38, such backward stops providing a rearward adjustment range of approximately 49°30' from the illustrated position. Similar stop surface 39 of symmetrical cover plate 48 engages a forward limit stop projection 40 of bracket 10a providing approximately 9° limit of forward adjustment range from the position shown. Within such stop limits any approximately adjusted position may be provided by engagement of pawl 16 with ratchet plate 14 and a precise adjustment of seat back position may be made with ratchet plate 14 held in fixed position by pawl 16 through manual rotation of taumel knob 41 drivingly secured to eccentric pin 12 through adapter 42 which rotates eccentric 13 causing external gear teeth 24 of ratchet plate 14 to rotationally advance internal gear teeth of intermediate plate 25, having a relatively greater diameter and number of teeth, by an increment of one tooth pitch spacing for each revolution of the taumel knob 41; thus providing an infinitely variable adjustment as well as a self-locking retention of such adjustment through taumel resistance of the teeth to relative rotation other than effected by driving rotation of cam 13 due to a self-locking angle of friction against reverse drive from the taumel gear teeth.

Bushing 21 is held rigidly against rotation by cover plate 43, secured to seat bracket 10 by rivets 17 and 44, having flats 45 engaging matching flats of bushing 21. Such flats are also engaged by the inner end of coiled leaf spring 46 the outer end 47 of which engages an extension of rivet 37 to provide torque for restoring the seat back to an upright position from any backward inclination.

Upon actuation of manual release lever 30 actuating latch 27 to a release position, seat back bracket 11 is free to pivot about central pin 12 while internal elements between sandwich side plates 11a and 11b remain stationary as well as release lever 20, 22.

From the above description it will be understood that the occupant by actuation of release handle 35 to position of 35a may quickly adjust the seat back to any approximate desired position, which may be as close to final desired position as the pitch of ratchet teeth 15, following which a precise adjustment to any exact desired position may be readily provided through a relatively small manual rotation of taumel knob 41. Also, as to relieve fatigue through minor readjustment of the back rest angle, the hand knob 41 alone may be employed without resort to handle 35. Such minor adjustments while the vehicle is underway are accomplished with perfect safety due to the self-locking action of the taumel gearing as compared with prior art recliners relying solely on ratchet release for adjustment wherein release while the vehicle is underway renders the back rest position momentarily unstable and subject to overtravel, as in a backward reclining direction.

In accommodating forward tilting of the back rest for rear passenger entry and exit reliance on manual release lever 30 to overcome tension spring 29 permits a relatively close coupling between latch 27 and projection 26. As an alternative tension spring 29 may be dispensed with and latch 27 adapted to function as an inertia latch which will open by gravity upon forward tilting of the seat back with the vehicle stationary by modifying the engagement position of the projection 26 to 26a in order to provide somewhat greater clearance for release movement of the latch incident to manual tilting of the seat back.

With reference to FIGS. 3 and 4 a further modification is disclosed wherein forward tilting of the seat back for rear passenger entry and exit is accommodated by a separate pivotal mounting 50 for upper seat back bracket 51 release by manual lever 52 disengaging extension 53 from projection 54 of seat back hinge 51, the normally engaged position of extension 53 being retained by coiled torsion spring 54 anchored to intermediate plate at 55. In this modification intermediate plate 25a is provided with upward extension 56 serving to pivotally mount upper bracket 51 and provide a back stop 57 for an offset projection 58 of upper bracket 51. Cover plate 35a in this case has an upward extension 59 providing a spaced bearing for pivot 50 and a sandwich enclosure for pivoted release lever 52. In all other respects the ratchet plate and taumel mechanism under the control of hand lever and taumel knob are the same as in the first embodiment.

With reference to FIGS. 5, 6 and 7 a further modification is particularly adapted for four-door models where forward seat back dumping is not required to accommodate entry and exit of rear seat passengers, or in two-door vehicles which do not have a rear seat. In this case the upper seat back hinge 60 is rigidly connected to cover 35b in intermediate plate 25b by rivets 61 and forward tilting is limited to the 9° forward adjustment accommodated by engageable surfaces 39 and 40 with rearward adjustment of approximately 49°30' limited by engaging surfaces 34 and 36 as in the first embodiment. In other respects the functioning of ratchet plate and taumel gearing is the same as in previously described embodiments and in FIG. 7 the fragmentary elements disclosed corresponding to like numbered elements in FIGS. 1 and 2.

In summary the various embodiments have in common a manually releasable ratchet/pawl means for quickly adjusting the back rest to any desired approximate position within a total predetermined range of adjustment and a supplemental manual taumel means for effecting gradual adjustment to any precise back rest position, including a combination of such quick and gradual adjustment means in a manner which always permits quick adjustment away from either extremity of the total range of adjustment regardless of any prevailing taumel adjustment. Such combination of adjustment means together with a releasable feature for forward dumping of the back rest to permit rear seat passenger entrance and exit in two-door models provides a maximum of convenience and safety relative to any known prior art hinge system in achieving optimum comfort and relief of fatigue for the passenger through precise back rest positioning.

I claim:

1. A hinge fitting for adjustably connecting a seat and a back rest comprising a seat hinge member, a back rest hinge member, a pivotal connection between said members, means limiting a range of adjustment for the operative relation of said members between maximum forward and maximum rearward positions of said back rest hinge member, manually releasable toothed ratchet and pawl means for permitting quick adjustment to an approximate fixed operative relation within said range, and manually adjustable taumel means for gradually effecting a precise fixed operative relation at any desired position, said respective means including in combination means accommodating quick adjustment from either extremity of said range to any intermediate or other extremity position regardless of the prevailing taumel adjustment.

2. A hinge fitting as set forth in claim 1 wherein said toothed ratchet means includes ratchet teeth around a 360° circular perimeter.

3. A hinge fitting as set forth in claim 1 including fixed positive stop means on said seat hinge member limiting said range of adjustment at both forward and rearward extremities.

4. A hinge fitting as set forth in claim 3 including means for reaching either of said positive stop extremities through either release of said toothed ratchet and pawl means or through said taumel means.

5. A hinge fitting as set forth in claim 1 including releasable latch means permitting forward pivoting of said back rest hinge member to a rear seat passenger accommodating position.

6. A hinge fitting as set forth in claim 5 including said forward pivoting of said back rest hinge member about said adjustment pivotal connection.

7. A hinge fitting as set forth in claim 5 wherein said toothed ratchet means includes ratchet teeth around a 360° circular perimeter.

8. A hinge fitting as set forth in claim 1 including a supplemental pivotal connection for said back rest hinge member independently of said first named pivotal connection and adjustment of the back rest hinge member relative thereto.

9. A hinge fitting as set forth in claim 6 including manually releasable latch means for controlling said forward back rest dumping.

10. A hinge fitting as set forth in claim 6 including inertia latch means responsive to gravity release when said vehicle is stationary for permitting forward tilting of said back rest.

11. A hinge fitting as set forth in claim 1 including a manual release lever pivoted on said pivotal connection for said hinge members actuating said pawl means to a release position.

12. A hinge fitting as set forth in claim 1 including a manual release lever pivoted on said pivotal connection for said hinge members actuating said pawl means to a release position, said lever having both occupant hand and rear passenger foot accessible extremities.

13. A hinge fitting as set forth in claim 1 including an intermediate plate between said seat and back rest hinge members having a common pivotal connection and forming one element of said taumel adjustment means.

14. A hinge fitting as set forth in claim 13 including a ratchet plate forming a second element of said taumel adjustment means as well as a toothed ratchet element for said ratchet and pawl means.

15. A hinge fitting as set forth in claim 14 including a cylindrical eccentric pivotal mounting for said ratchet plate having a pivotal axis common with the pivotal axis of said seat bracket, said intermediate plate and said back rest hinge element having a common pivotal axis eccentric to said cylindrical pivot.

16. A hinge fitting as set forth in claim 15 wherein said ratchet plate has ratchet teeth extending around its entire outer perimeter.

17. A hinge fitting as set forth in claim 15 wherein said ratchet plate has ratchet teeth extending around its entire outer perimeter as well as external taumel gear teeth.

* * * * *